US006396590B1

(12) United States Patent
Wang et al.

(10) Patent No.: US 6,396,590 B1
(45) Date of Patent: May 28, 2002

(54) PROCESS AND SYSTEM FOR DETERMINATION OF LAYER THICKNESS SWELL OF WOOD COMPOSITES

(75) Inventors: Siqun Wang; Paul Michael Winistorfer, both of Knoxville, TN (US)

(73) Assignee: The University of Tennessee Research Corporation, Knoxville, TN (US)

( * ) Notice: Subject to any disclaimer, the term of this patent is extended or adjusted under 35 U.S.C. 154(b) by 0 days.

(21) Appl. No.: 09/394,738

(22) Filed: Sep. 13, 1999

(51) Int. Cl.$^7$ ................................................ G01B 11/06

(52) U.S. Cl. ................................................... 356/630

(58) Field of Search .................... 356/630, 631, 356/632; 9/635; 73/800, 865.8; 156/62.2, 62.4, 283, 335; 364/125, 115, 123, 124, 336; 250/559.27; 428/308.8, 318.4, 318.8

(56) References Cited

U.S. PATENT DOCUMENTS

| 4,854,172 A | | 8/1989 | Lemaster et al. |
| 4,984,894 A | * | 1/1991 | Kondo ........................ 356/382 |
| 5,028,286 A | * | 7/1991 | Hsu ........................... 156/82.4 |
| 5,436,069 A | * | 7/1995 | Winterowd et al. ....... 428/308.8 |
| 5,635,123 A | * | 6/1997 | Riebel et al. ............... 264/125 |
| 5,661,250 A | * | 8/1997 | Katahira et al. ............ 73/865.8 |
| 5,716,563 A | * | 2/1998 | Winterowd et al. ........ 264/45.5 |
| 5,718,786 A | | 2/1998 | Lindquist et al. |
| 5,847,058 A | | 12/1998 | Teodorczyk |
| 5,880,450 A | | 3/1999 | Katoh et al. |
| 5,936,218 A | | 8/1999 | Ohkawa et al. |

FOREIGN PATENT DOCUMENTS

JP          1-156602   *   6/1989

OTHER PUBLICATIONS

Suchsland, ""Hygroscopic Thickness Swelling and Related Properties of Selected Commercial Particleboards"," Forest Products Journal, vol. 23 (No. 7), p. 26–30, (Jul. 16, 1973).

Winistorfer et al., ""Dynamics of Wood Composite Mats During Consolidation: Monitoring Density Development During Pressing with an In–situ Density Monitoring System"," European Panel Products Symposium, p. 12–23.

ASTM, ""Standard Methods of Evaluating the Properties of Wood–Base Fiber and Particle Panel Materials"," ASTM Designation: D 1037–78, p. 298–299, 312–315.

Geimer, Robert L. , ""Dimensional Stability of Flakeboards As Affected By Board Specific Gravity and Flake Alignment"," Forest Products Journal, vol. 32 (No. 8), p. 44–52, (Aug. 1982).

Liu et al. , ""Thickness Swelling and Density Variation In Aspen Flakeboards"," Wood Science and Technology, p. 73–82, (1991)

(List continued on next page.)

Primary Examiner—Hoa Q. Pham
(74) Attorney, Agent, or Firm—Jenkins & Wilson, P.A. A process and system for obtaining a thickness swell measurement of a wood composite material sample. The process includes placing a measurement pattern on an edge of a wood composite material sample, the measurement pattern including layers having a thickness; measuring the thickness of at least one of the layers of the measurement pattern prior to exposing the wood composite material sample to a thickness swell-inducing condition; exposing the wood composite material sample to a thickness swell-inducing condition; and re-measuring the thickness of the at least one layer after exposing the wood composite material sample to a thickness swell-inducing condition to thereby obtain a thickness swell measurement for the wood composite material sample. Representative wood composite materials include medium density fiberboard (MDF), oriented strandboard (OSB) and particle board.

38 Claims, 6 Drawing Sheets

OTHER PUBLICATIONS

Rowell et al., ""Dimensional Stabilization of Flakeboard By Chemical Modification"," Wood Science and Technology, p. 83–95, (1986).

Winistorfer et al., ""Influence of Three Wax Formulations and Three Application Rates On Thickness Swell Performance of Southern Pine Flakeboard"," Forest Products Journal, vol. 46 (No. 3), p.63–67, (Mar. 1996).

Winistorfer et al., ""Layer Water Absorption of Medium Density Fiberboard and Oriented Strandboard"," Forest Products Society, vol. 46 (No.6), p. 69–72, (Jun. 1996).

Xu et al., ""Layer Thickness Swell and Layer Internal Bond of Medium Density Fiberboard and Oriented Strandboard"," Forest Products Journal, vol. 45 (No. 10), p. 67–71, (Oct. 1995).

Xu et al., ""A Procedure to Determine Thickness Swell Distribution In Wood Composite Panels"," Wood and Fiber Science, vol.27 (No. 2), p. 119–125, (1995).

Xu et al., ""A Procedure to Determine Water Absorption Distribution In Wood Composite Panels"," Wood and Fiber Science, vol. 28 (No. 3), p. 286–294, (1996).

* cited by examiner

FIG. 2 MDF

FIG. 3 OSB

PROCESS AND SYSTEM FOR DETERMINATION OF LAYER THICKNESS SWELL OF WOOD COMPOSITES

GRANT STATEMENT

This work was supported by USDA-NRI Grant No. 95-37103-2104. Thus, the U.S. Government has certain rights in the invention.

TECHNICAL FIELD

The present invention relates to generally to wood composite materials and more particularly to a process and system for obtaining a thickness swell measurement for a wood composite material sample.

| Table of Abbreviations | |
|---|---|
| ASTM | American Society for Testing and Materials |
| ETS | edge thickness swell |
| LVL | laminated veneer lumber |
| MDF | medium density fiberboard |
| OSB | oriented strandboard |
| PF | phenol-formaldehyde resin |
| TS | thickness swell |
| UF | resin urea formaldehyde resin |

BACKGROUND ART

Despite significant research efforts put forth over several decades and the progress made to reduce thickness swell response of wood-based composite panels, thickness swell and resulting degradation of associated panel properties remains a priority issue for the wood-based panel industry. Thickness swell in a wood composite material is recognized as having two components: (a) the normal swelling characteristics of the wood itself, and (b) the swell component that develops from the release of compression stresses in the mat which forms the wood composite material. The swell originating from the wood itself is considered recoverable; the swell originating from the release of compressive stresses is considered non-recoverable swell, and is commonly called "springback".

Existing standard measurement methods continue to rely on changes in total thickness of a sample as measured with a single caliper instrument in the evaluation of thickness swell. A representative standard technique for measuring total thickness swell and water absorption is disclosed in a procedure set forth in *ASTM* 1037-92 A (1992). Summarily, total thickness swell (TS) is taken at the midpoint of each side of a wood composite sample one inch (1") in from the edge using a dial caliper. Total edge thickness swell (ETS) is taken at each edge of the sample at the same mid-point location of each edge as the total thickness swell measurement is taken. Water absorption is based on weight changes of the sample at pre-selected exposure intervals.

Two representative techniques have been attempted in the art in an effort to determine thickness swell characteristics within a wood composite panel. See Xu, W. and P. M. Winistorfer, "*A Procedure to Determine Thickness Swell Distribution in Wood Composite Panels*", Wood and Fiber Science 27(2);119–125 (1995), and Xu. W. and P. M. Winistorfer, "*Layer Thickness Swell and Layer Internal Bond of Medium Density Fiberboard and Oriented Strandboard*", Forest Prod. J. 45(10): 67–71 (1995).

The technique proposed by Xu and Winistorfer in *Wood and Fiber Science* 27(2):119–125 (1995) pertains to an intact specimen algorithm to determine thickness swell distribution across the board thickness based on vertical density distribution changes measured before and after water exposure treatment. The technique proposed by Xu and Winistorfer in *Forest Prod. J.* 45(10): 67–71 (1995) is a layer slicing procedure in which thin horizontal layers are sectioned from composite samples and subsequently tested for thickness swell after 24-hour water soak.

Both techniques suffer from limitations that restrict their widespread implementation as a standard protocol. The intact algorithm method requires the nondestructive measurement of density through the sample thickness. While laboratory densitometers utilizing a gamma source may be used to make measurements on standard 150×150 mm thickness swell samples, current commercial densitometers for the panelboard industry can only be utilized with standard 50×50 mm internal bond samples for density profile measurement. The same limitation applies to the layer slicing technique in that only 50×50 mm samples can be prepared with the technique, while the standard size of a wood composite sample used in thickness swell evaluation is 150×150 mm. The removal of saw kerf material adds an additional source of measurement error in the layer slicing technique. Moreover, individual layers that are removed from the intact specimen more easily absorb water and will thus swell more than or less than the intact, whole sample without the influence of internal stress.

Significantly, important information about panel material response to swell conditions and the overall resulting performance of the panel material is not revealed by existing methods. Therefore, the development of an improved process and system for evaluating the thickness swell of a wood composite material represents an ongoing and long-felt need in the art.

SUMMARY OF THE INVENTION

A process and system for obtaining a thickness swell measurement of a wood composite material sample is disclosed. The process comprises placing a measurement pattern on an edge of a wood composite material sample, the measurement pattern comprising a plurality of layers, each of the layers having a thickness; measuring the thickness of at least one of the layers of the measurement pattern prior to exposing the wood composite material sample to a thickness swell-inducing condition; exposing the wood composite material sample to a thickness swell-inducing condition; and re-measuring the thickness of the at least one layer after exposing the wood composite material sample to a thickness swell-inducing condition to thereby obtain a thickness swell measurement for the wood composite material sample.

A system suitable for use in carrying out the process of the present invention is also disclosed herein.

Accordingly, it is an object of the present invention to provide a non-destructive process for measuring and evaluating thickness swell in wood composites that provides information not previously available from existing standard measurement methods.

It is another object of the present invention to provide a non-destructive process for measuring and evaluating thickness swell in wood composites that accommodates the analysis of multiple internal layers of a wood composite material.

It is yet another object of the present invention to provide a non-destructive process for measuring and evaluating thickness swell in wood composites that provides more information than existing prior art processes about the total material response during or after completion of any of the standard water soak or high humidity exposure condition treatments used to evaluate panel stability.

It is a further object of the present invention to provide a non-destructive process for measuring and evaluating thickness swell in wood composites that can be used as an improved quality control technique for production plants.

It is yet a further object of the present invention to provide an efficient and non-destructive process for measuring and evaluating thickness swell in wood composites for the wood composite industry as a whole.

It is still a further object of the present invention to facilitate research and development of new products and improvements/modifications in product performance by providing an improved process for measuring and evaluating thickness swell in wood composites.

These and other objects are achieved in whole or in part by the invention as disclosed herein. Some of the objects of the invention having been stated hereinabove, other objects will become evident as the description proceeds, when taken in connection with the accompanying Examples and Drawings as best described hereinbelow.

DETAILED DESCRIPTION OF THE INVENTION

Figure 1:
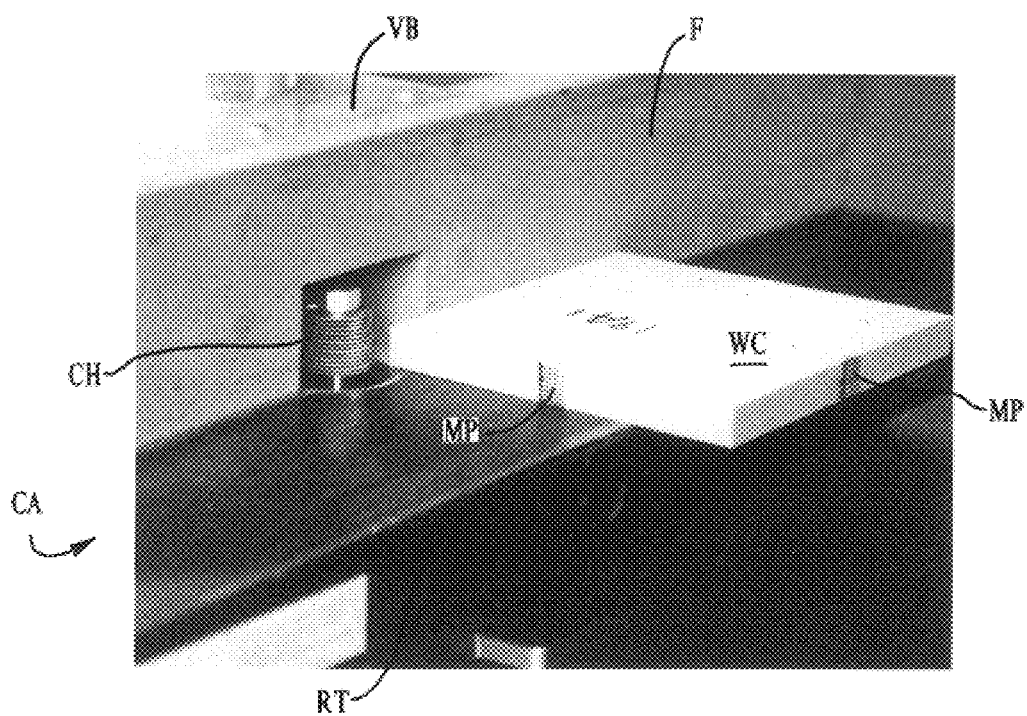
FIG. 1 is a photograph of a perspective view of the cutterhead assembly, having alternating blades and spacers, that is used to form layers on an edge of a wood composite material sample in accordance with the present invention (an MDF sample is shown)

The present invention relates to an improved process and system for the determination of layer thickness swell within intact samples of wood composite panel materials. Advantageously, the process and system of the present invention provide an analysis of variables pertaining to panel material response to swelling conditions not previously available from the existing standard measurement process. Therefore, in a single test, the present invention provides information not previously available about the wood composite panel material and meets a long-felt need in the field for an improved process for the evaluation of thickness swell.

Wood composite materials typically incorporate a mixture of a lignocellulosic furnish with a binder. The furnish employed will frequently be wood, but many other lignocellulosic materials can also be used, e.g. bagasse-, straw- and bamboo-based products. The binder is preferably a resin adhesive such as urea-formaldehyde resin, isocyanate, phenol-formaldehyde resin or phenol-resorcinol formaldehyde resin. In a representative manufacturing process, the mixture is formed into a mat and the mat is pressed and/or heated to an extent sufficient to cure the binder and form the wood composite article. Representative manufacturing processes are also disclosed in U.S. Pat. Nos. 4,854,172, 5,718,786, and 5,847,058, the entire contents of each of which are incorporated by reference herein.

Thus, wood composite materials typically have a density profile which varies through the thickness of the material. The density profile of a wood composite material is typically a product of the interaction of pressure, heat and other variables of the composite mat itself, including but not limited to: structure of the mat furnish, implementation of art-recognized layer forming techniques via alternating orientation of furnish particles, furnish moisture content, and binder type and amount. Indeed, it will be appreciated by one of ordinary skill in the art that there are other recognized composite manufacturing process interaction variables that influence the formation of the density profile. As disclosed herein, recognition of the density profile through the thickness of the panel is identified as one of the key variables in understanding the thickness swell phenomenon. Layer swell within a wood composite sample is also important in understanding the swell phenomena of wood composites.

In accordance with the present invention, a nondestructive optical process was developed to determine layer thickness swell of discrete layers within intact samples of wood composites. The process comprises placing a measurement pattern on an edge of a wood composite material sample, the measurement pattern comprising a plurality of layers, each of the layers having thickness; measuring the thickness of at least one of the layers of the measurement pattern prior to exposing the wood composite material sample to a thickness swell-inducing condition; exposing the wood composite material sample to a thickness swell-inducing condition; and re-measuring the thickness of the at least one layer after exposing the wood composite material sample to a thickness swell-inducing condition to thereby obtain a thickness swell measurement for the wood composite material sample. A system suitable for use in carrying out the process of the present invention is also disclosed herein.

It is contemplated that thickness swell response in any wood composite material can be evaluated in accordance with the present invention. Representative wood composite materials include, but are not limited to, medium density fiberboard (MDF), oriented strandboard (OSB), laminated veneer lumber (LVL), particleboard, plywood, any panel manufactured from any agricultural fiber source, wood composite manufactured from dissimilar wood furnish materials, and newly evolving wood composite materials that comprise wood and nonwood furnish.

The term "measurement pattern" is adopted herein for convenience to refer to the plurality of layers which are placed, marked or formed in any manner on or in the edge of a wood composite material sample in accordance with the thickness swell evaluation process of the present invention to facilitate measurement of thickness swell in discrete layers of the wood composite material. As disclosed hereinbelow, a representative embodiment of the present invention employs a cutterhead assembly to form a measurement pattern comprising a series of slots and bars in a coating applied to at least a portion of at least one edge of the wood composite material sample.

A measurement pattern suitable for use in association with the present invention can be placed or formed on an edge of a wood composite material sample by any suitable step or means. Representative steps or means include but are not limited to non-invasive marking and/or stamping the edge of a wood composite material sample with an ink stamp (such as in indelible ink stamp), placing a decal or other indicia which define layers on the edge of the wood composite material sample, and marking the edge of a wood composite material sample with a laser technique or laser device. The use of a laser is particularly contemplated to facilitate precise marking and to minimize loss of wood composite material from the marked edge. For example, a laser can be employed to remove or ablate a paint or coating material that is applied to at least a portion of the surface of the wood composite material edge so as to provide for layer demarcation with minimal loss of wood composite material. A laser may also be employed to strike or burn a measurement pattern comprising a very fine series of layers, e.g. hair-like layers. Thus, the present invention contemplates any step or means that can visibly mark the edge of the sample so that, preferably, a contrast can be recognized between alternating layers.

The measurement pattern preferably has a width which spans the thickness of the wood composite material sample. The layers of the measurement pattern can be further characterized as alternating layers. That is, two successive layers within the measurement layers preferably have at least one distinguishing aspect with respect to each other. Optionally, the two successive layers are repeated across the width of the measurement pattern and hence, in a preferred embodiment, across the thickness of the wood composite material sample.

The layers of the measurement pattern can be further characterized as alternating contrasting layers. That is, two successive layers within the measurement layers preferably have at least one distinguishing aspect with respect to each other that provides a marked contrast between the two successive layers to facilitate measurement. Optionally, the two successive layers are repeated across the width of the measurement pattern and hence, in a preferred embodiment, across the thickness of the wood composite material sample.

Small differences in the swell response between the alternating layers can be minimized by alternating the location of the alternating layers in the sample edge, i.e., two of the four sample edges can be prepared with one of the alternating layers beginning at the sample face, and the other two sample edges can be prepared with the other of the alternating layers beginning at the sample face, as disclosed below. Average thickness swell of any discrete layer will be the average change in thickness obtained from the respective layer in each measurement pattern on each sample edge.

As used herein the term "thickness swell measurement" is meant to encompass the measurement of a change in thickness of at least one layer of the measurement pattern formed on at least one edge of the wood composite material sample before exposure and after each stage of exposure. The measurement of the change in thickness of at least one layer facilitates the evaluation of how much that layer swells and thus, how much that layer contributes to overall thickness swell.

Additionally, the term "thickness swell measurement" is meant to characterize a measurement of a change in thickness of a group of the layers in the measurement pattern employed in the present invention. Particularly, layers can be characterized or grouped according to their location within the measurement pattern on the edge of the wood composite material sample. For example, layers can be grouped as "core region layers" and as "surface region layers" as disclosed herein below. Thus, the term "thickness swell measurement" can refer to a measurement of a change in thickness of at least one and preferably all layers grouped within the core region or within the surface regions of the wood composite material sample so that data can be obtained on the swell of the layers within the core region and the surface regions.

Such data is significant in view of the variation in density profile across a wood composite material sample. Indeed, the evaluation of thickness swell in the core region and in the surface regions of a wood composite material sample can be utilized in quality control efforts and in designing improved wood composite materials. For example, materials can be selected and/or pressing techniques can be adopted such that the materials that form the core region or surface region of a wood composite material have desirable swell response characteristics.

Preferably, a thickness of each of two or more of the layers in the measurement pattern is measured prior to exposing the wood composite material sample to a thickness swell-inducing condition. In this case, the thickness of each of the measured layers is re-measured after exposing the wood composite material sample to a thickness swell-inducing condition to thereby obtain a thickness swell measurement for the wood composite material sample.

More preferably, the thickness of each layer in the measurement pattern is measured prior to exposing the wood composite material sample to a thickness swell-inducing condition. In this case, the thickness of each of the measured layers is re-measured after exposing the wood composite material sample to a thickness swell-inducing condition to thereby obtain a thickness swell measurement for the wood composite material.

Contemplated thickness swell measurements thus include measurement of individual layer swell, measurement of layer swell within discrete surface regions and core regions of the wood composite material, total edge thickness swell and total overall thickness swell. Representative formulas for obtaining or calculating the contemplated thickness swell measurements are set forth herein. These formulas are meant to be representative only, and are not meant to be construed as limiting of the present invention. Indeed, the contemplated thickness swell measurements can be calculated or obtained using any suitable measurement, calculation or formula, as would be apparent to one of ordinary skill in the art after reviewing the disclosure of the present invention.

The term "a thickness swell-inducing condition" is meant to refer to any environmental or other condition which induces thickness swell in a wood composite material sample. Representative thickness swell-inducing conditions include, but are not limited to, water exposure, liquid exposure, humidity exposure, or other such exposures. By way of additional example, water exposure can be accomplished by immersing a sample completely in water for a pre-determined time interval as are disclosed in the Examples. Other thickness swell-inducing conditions would be apparent to one of ordinary skill in the art after reviewing of the disclosure of the present invention.

In a representative embodiment of the present invention, measurements are taken using a camera and a stereomicroscope in conjunction with a reference measurement indicator having a known measurement dimension in conjunction with a ruler, calipers, other suitable measurement tool, and/or combinations thereof. However, any suitable measurement step or means is contemplated in accordance with the present invention. Particularly contemplated measurement steps or means thus also include laser scanning technologies (such as those employed in bar code readers as are disclosed in U.S. Pat. Nos. 5,936,218 and 5,880,450, herein incorporated by reference), computer imaging technology, computer software programs to obtain measurements/perform measurement calculations, combinations of these technologies, and/or other automation technologies.

Therefore, a key aspect of the present invention is the use of discrete layer measurement in evaluating thickness swell in a wood composite material sample. The present invention recognizes the importance of discrete layer measurement and the information it reveals and provides about overall wood composite material thickness swell performance. Hence, the present inventive measurement process addresses the previously uncharacterized layer thickness swell attributes of a wood composite material and thus meets a long-felt need in the art for a process which facilitates characterization of these attributes.

EXAMPLES

The Examples presented below have been included to illustrate preferred modes of the invention. Certain aspects of the Examples are described in terms of devices, techniques and procedures found or contemplated by the present inventors to work well in the practice of the invention. The Examples are exemplified through the use of standard laboratory practices of the inventors. In light of the present disclosure and the general level of skill in the art, those of ordinary skill in the art will appreciate that the Examples are intended to be exemplary only and that numerous changes, modifications and alterations can be employed without departing from the spirit and scope of the invention.

Preparation of Wood Composite Samples Evaluated In Examples

Figure 2:
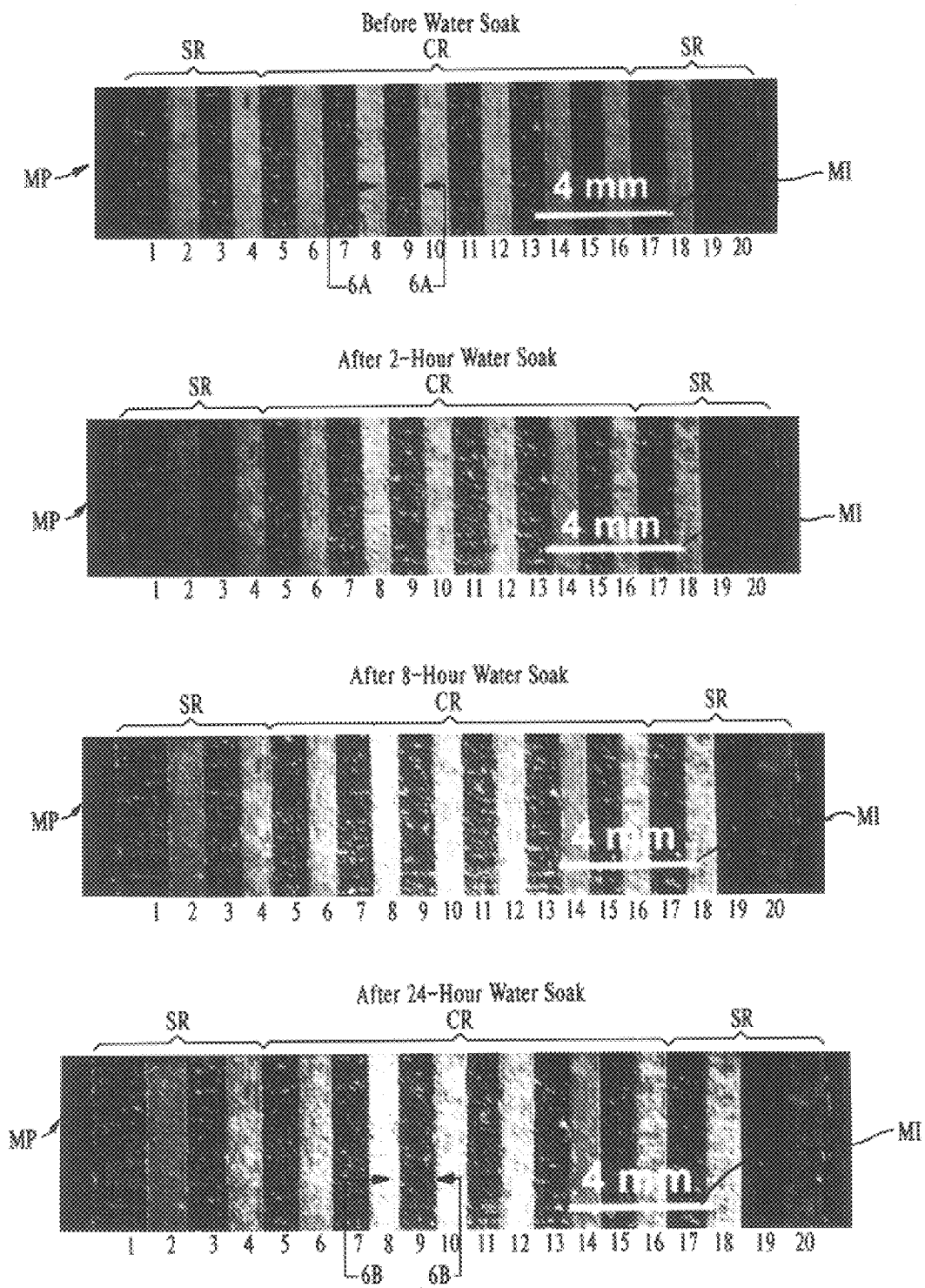
FIG. 2 is a set of photographs of a measurement pattern formed on a representative MDF edge before water soak and after 2, 8 and 24 hour water exposure.
Figure 3:
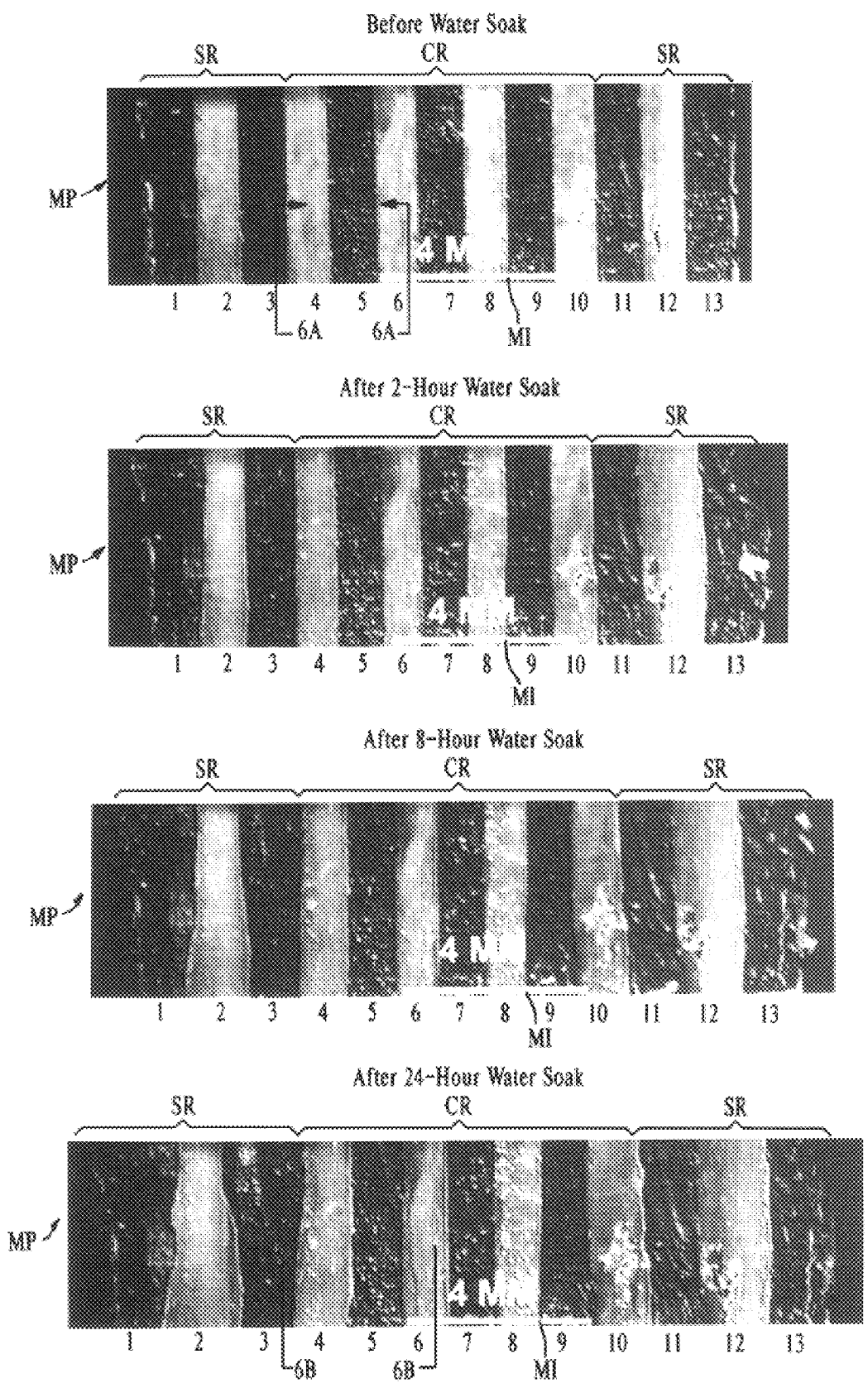
FIG. 3 is a set of photographs of a measurement pattern formed on a representative OSB edge before water soak and after 2, 8 and 24 hour water exposure.

Referring now to FIGS. 1–3, an apparatus and a method for preparing a standard wood composite sample WC for use in evaluating thickness swell response in accordance with the present invention are depicted. As best seen in FIG. 1, cutterhead assembly CA includes a multiple blade cutterhead CH comprising 16 jewelers' saw blades 50 mm in diameter, 16 shim stocks 40 mm in diameter and a 18 mm diameter mandrel 10 cm long. Individual saw blade and shim stock thickness was 0.78 mm (0.031"). Saw blades and shim stock were alternately placed on the mandrel and secured with a locking nut to form cutterhead CH. The cutter-head mandrel was secured in a router chuck and the router was then attached to the underside of a fixed router table RT. Cutterhead CH protrudes through the surface of router table RT. Fence F and vacuum box VB are attached to router table RT. Fence F limits the cutting or marking depth of cutterhead CH into the edge of sample WC to minimize loss of wood composite material.

Commercial medium density fiberboard (MDF) and oriented strandboard (OSB) were acquired from commercial sources. The MDF was 5/8" thickness (sanded), and bonded with a urea formaldehyde (UF) resin. The OSB was unsanded, nominal ½" thickness, and bonded with a phenol-formaldehyde (PF) resin.

Four samples WC measuring 150 mm×150 mm were cut for both MDF and OSB. Each sample WC edge was lightly sanded after cutting using a stationary belt sander. Sander dust was blown out of the sample edge using a pressurized airstream. The midpoint of each edge was marked along the 150 mm length, and a black water-based paint was applied as a coating or coating layer with a brush to the sample edge at the midpoint in a band approximately 12 mm wide.

Continuing with FIGS. 1–3, cutterhead CH was used to mark measurement patterns MP on sample WC edge at the midpoint marked with the black paint coating. As noted above, the depth of the mark formed into the sample WC edge to form measurement patterns MP was limited to approximately 0.013 mm (0.0005") via fence F so as to mark the coating layer with minimal removal of wood composite material. All four edges of each sample WC were prepared in this way. The small mark formed into the sample WC edge by the saw blade is referred to herein as the "slot"; the space between slots created by the use of the shim stock in which no material was removed is referred to herein as the "bar". The slots and bars are thus examples of "alternating layers". The bars bear the black paint, and hence the bars are black and the slots are the color of the wood composite material. Thus, the slots and bars are also examples of "alternating contrasting layers".

Photographs of prepared sample WC edges of the MDF and OSB samples are shown in FIGS. 2 and 3. As best seen in FIG. 2, the MDF sample is of a thickness sufficient to facilitate the formation of a measurement pattern MP having twenty layers. The layers have been individually labeled 1–20 from left to right in each of the photographs presented in FIG. 2. The set of four photographs depict layers 1–20 before water soak, after 2 hour water soak, after 8 hour water soak and after 24 hour water soak.

In FIG. 2, bars are given odd numbers and slots are given even numbers. This embodiment of measurement pattern MP is formed on two perpendicular sides of the wood composite material sample WC. On the other two perpendicular sides of wood composite material sample WC the slots are designated with odd numbers in that cutterhead CH is applied to the sample such that the layer formed closest to the surface of the wood composite material sample WC is a slot. Correspondingly, in the two sides of the wood composite sample material not shown herein in detail, the bars are given even numbers.

Continuing with FIG. 2, layers 1–3 and 18–20 as shown define surface region layers of the wood composite material sample WC and are referred to collectively with the reference character SR. Layers 4–17 define the core region of the wood composite material sample WC and are referred to collectively with the reference character CR. The layers which define surface regions SR and core region CR are individually measured as described herein to provide for the characterization of thickness swell response in surface regions SR and core region CR as well as to evaluate contributions of each of these regions to thickness swell response in the wood composite material sample WC.

Referring now to FIG. 3, a measurement pattern MP formed on an edge of an OSB wood composite material sample WC is depicted in a set of four photographs before water soak, after 2 hour water soak, after 8 hour water soak and after 24 hour water soak. The OSB sample edge accommodated the formation of 13 layers with cutterhead CH. Each of these layers have been labeled as 1–13 in FIG. 3. The bar layers of the measurement patterns depicted in FIG. 3 comprise odd layers 1, 3, 5, 7, 9, 11 and 13 while slot layers are designated with even numbers 2, 4, 6, 8, 10 and 12. This measurement pattern MP of slots and bars is provided on two perpendicular sides of the OSB sample WC while on the two other perpendicular sides of the OSB sample WC, slots comprise odd-numbered layers and bars comprise even-numbered layers.

Continuing with FIG. 3, layers 1–3 and 11–13 define surface regions SR. Layers 4–10 define core region CR. Thus, in accordance with the present invention, thickness swell measurements of layers 4–10 are taken to determine thickness swell in core region CR, and thickness swell measurements of layers 1–3 and 11–13 are taken to evaluate thickness swell in surface regions SR. The contribution to overall thickness swell response by core region CR and surface regions SR in an OSB sample can thus be evaluated.

Referring now to FIGS. 2 and 3, prior to the water soak exposure, color slide film was used to record the image of the measurement pattern MP formed on the edge of each sample WC using a 35 mm camera mounted on the downtube of stereomicroscope. A reference measurement image MI having a known reference dimension (4 mm) was affixed to the sample edge near the location of the measurement pattern MP. Subsequent photographic images were then taken of each measurement pattern MP at the end of the 2, 8 and 24 hour exposure periods. The photographic slides of the measurement patterns MP were then projected on a screen for measurement of each slot and bar thickness using a ruler. Reference measurement image MI was used as a magnification guide for the projected image.

Thickness Swell Measurement Calculations

The original thickness of each slot and bar in measurement pattern MP was denoted $T°_i$, i=layer number. After water soak, the swollen thickness of each slot and bar were measured and denoted $T^w_i$, i=layer number. The layer thickness swelling % layer TS of discrete layers in the sample, measured from the thickness of each slot and bar, were calculated as:

$$\text{Layer } TS_i = (T^w_i - T°_i)/T°_i, \quad \text{(equation 1)}$$

where i=1~20 for MDF, or i=1~13 for OSB

The individual layer thickness swelling measurement was calculated from the average of the measurements taken from each measurement pattern MP on each sample edge. The total thickness swelling ($TS_{op}$) as measured by the present invention was calculated as:

$$TS_{op} = (\Sigma \text{Layer } TS_i * T°_i) / \Sigma T°_i \quad \text{(equation 2)}$$

In theory, the total edge thickness swell (ETS) is equal to the sum of the thickness swell of individual layers:

$$ETS = \Sigma \text{Layer } TS \quad \text{(equation 3)}$$

The equations were adapted from typical swell response equations familiar to and used by those of ordinary skill in the art. The equations depict the original thickness, the thickness after the swell period and the summation of the swell of individual layers.

Layer thickness swell, water absorption, total thickness swell (TS) and edge thickness swell (ETS) were measured from each MDF and OSB specimen after water exposure times of 2, 8, and 24 hours. To obtain comparison data, total thickness swell and water absorption measurements were performed in accordance with the *ASTM* 1037–92 A (1992) procedure. Summarily, the total thickness swell was taken at the midpoint of each side one inch (1") in from the edge using a dial caliper. Total edge thickness swell (ETS) was taken at the edge of the sample and the midpoint location used for the TS measurement using a dial caliper. Water absorption was based on weight changes of the sample at each exposure interval.

Example 1—MDF Sample

As noted above, FIG. 2 shows a representative measurement pattern MP on a MDF sample edge before and after swelling. Before water soak and after water soak, the demarcation of the slots and bars in measurement pattern MP on a sample edge appear very clearly as narrow black lines. There was adequate color and contrast differences between slots and bars on the projected image to easily measure the thickness of each individual layer (slot and bar). MDF exhibits uniform swelling of individual layers in both the surface regions SR and core regions CR, due to uniform furnish characteristics and uniform mat structure.

Comparison—Conventional Method v. Present Invention

Table 1 shows a comparison of the average dimensional stability of a commercial MDF sample, after 2, 8 and 24-hours of water soak exposure, using a conventional method (*ASTM* 1037–92 A (1992) procedure) and the present invention for thickness swell determination.

After 2,8 and 24 hours of water exposure, total MDF TS as determined by the conventional method was 1.432%, 3.026% and 5.739%, respectively. ETS as determined by the conventional method was 3.584%, 7.782% and 13.65% for the 2-, 8-, and 24-hour exposures, respectively, about twice as great as the swell 1 inch from the edge.

Total thickness swell ($TS_{op}$) measured in accordance with the present invention was 3.056%, 8.351% and 14.119% after 2, 8 and 24 hours of water exposure, respectively. The standard deviations of $TS_{op}$ were 0.669% to 0.88% and were larger than the standard deviations of conventional edge thickness swell measurement. The relative variations of $TS_{op}$ as compared to the conventional measurement approach, were −10.1% to 3.40%, and decreased as water soak time increased.

Observed Layer Thickness Swell of MDF

Figure 4:
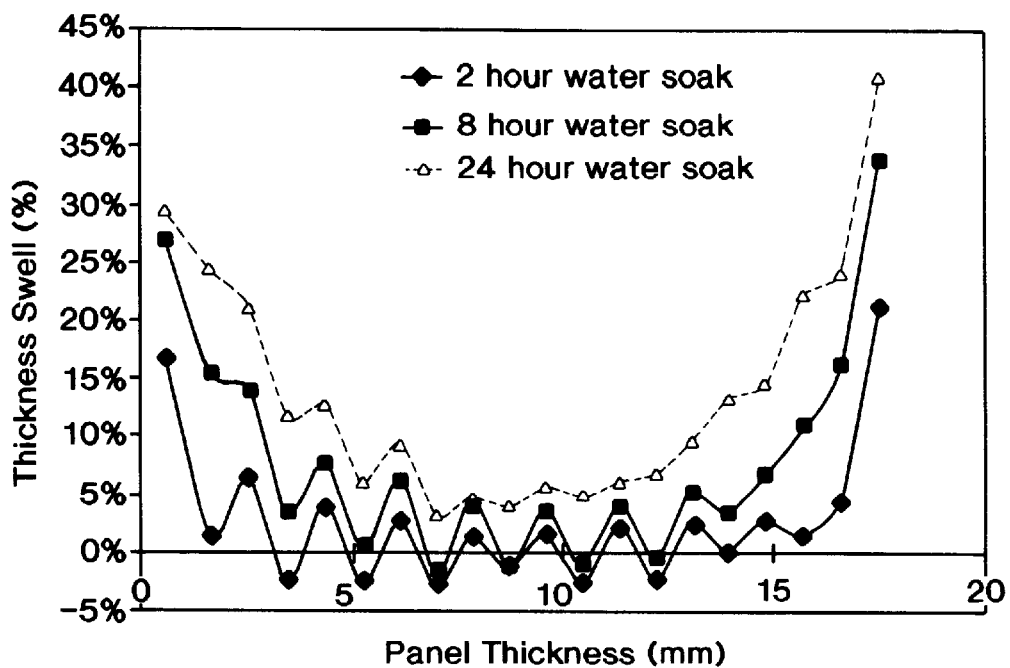
FIG. 4 is a graph depicting actual layer thickness swell of MDF in relation to exposure time.

The development of average actual layer thickness swell in relation to the water exposure time and layer location for the commercial MDF samples is shown in FIG. 4. Each point on each line of the graph of FIG. 4 represents a thickness swell measurement for layers 1–20 in the measurement pattern formed on the MDF samples. Layer thickness swell increased with prolonged water exposure. Maximum thickness swell is reached after 24 hours of water exposure. There were large differences in thickness swell between surface region layers SR and core region layers CR. There was 40.72% thickness swell in surface region layer 20 (Table 3) after 24 hours of water exposure. However, minimum thickness swell was only 3.26% for core region layer 8 after 24 hours of water exposure.

Maximum thickness swell occurred within surface region SR at layers 1 and 20. This result correlates to the vertical density profile of the MDF sample shown in FIG. 5. The MDF samples of this Example were sanded and hence, the outermost layers of surface region SR (layers 1 and 20) show the peak density at the sample surface.

Figures 6A, 6B:
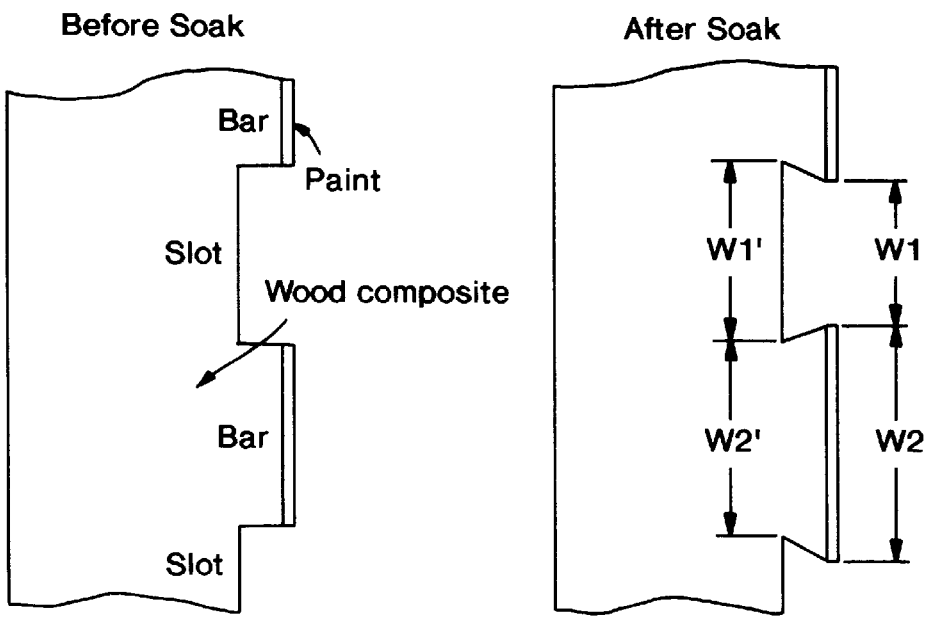
FIGS. 6A and 6B are partial cross-sectional view drawn along lines 6A—6A and 6B—6B, respectively, of the measurement pattern formed on an edge of a wood composite material sample in accordance with the present invention depicting the influence of slot and bar formation on layer swell.

The thickness swell data of MDF layers 4, 6, 8, 10, 12, and 14 were actually negative after 2 hours water exposure. Even after 8 hours water exposure, the data of layers 8, 10, 12 and 14 were negative. During sample preparation with the cutterhead, layers 4, 6, 8, 10, 12, and 14 became slots on the MDF sample edge. It was noted that the bars tend to swell slightly more than the slots (FIGS. 6A and 6B) due to the lack of material restraint that results as an artifact from marking slots and bars in the sample edge. Thus, the marking depth of cutterhead CH was maintained as shallow as was practical to still facilitate differentiation of the slot and bar demarcations. As shown in FIGS. 6A and 6B, the artifact was addressed by taking two thickness measurements W1 and W1' and W2 and W2', respectively, for each slot and bar, and then averaging the two measurements.

The small differences in the swell response between slots and bars were also minimized by alternating the location of the slot and bar marks in the sample edge, i.e., two of the four sample edges were marked with the slot beginning at the sample face, the other two sample edges were marked with the bar beginning at the sample face. Average thickness swell of any discrete layer was calculated as the average of two bar measurements and two slot measurements that represent the same discrete layer of material, but as measured from all four sides of the sample.

Figure 7:
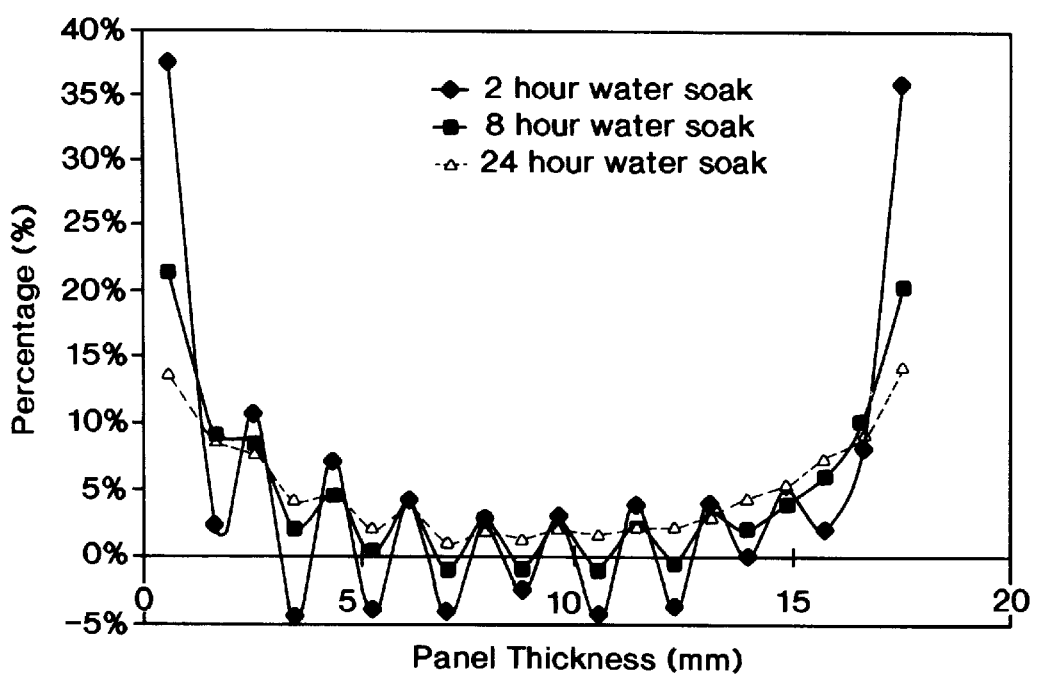
FIG. 7 is a graph depicting percentage thickness swell of individual MDF layers relative to total thickness swell of all layers in relation to water exposure time.

The contribution of individual layers to total thickness swell of commercial MDF was calculated and is shown in Table 3 and FIG. 7. For example, the contribution of layer 1 to total thickness swell was about 37.34% after 2 hours water exposure, and decreased as exposure time increased. The contribution of layer 1 to total thickness swell was 13.68% after 24 hours water exposure.

To understand the contribution of high and low-density areas to the total thickness swell, the whole thickness of a MDF sample was divided into surface regions SR and core regions CR. The surface region was 31.54% of the whole panel thickness and included layers 1–3 and layers 18–20. The low-density core region CR was 68.46% of the whole panel thickness and included layers 4–17. The contribution of the high-density surface regions SR to total thickness swell was 95.76%, 75.5% and 61.77% after 2 hours, 8 hours, and 24 hours water exposure, respectively (Table 2). This indicates that thickness swell occurred mainly in the high-density surface regions SR during the early period of water exposure.

The greater thickness swell in the surface regions SR of MDF suggests that efforts to improve dimensional stability of MDF should be focused on stabilizing the high-density layers of surface regions SR.

Example 2—OSB Sample

FIG. 3 shows a representative OSB sample edge before and after swelling. Before water soak, slots and bars appear as straight lines. After 2 hours water exposure, some of the layers of surface region SR (e.g. layers 1, 2, 12 and 13) exhibit a non-uniform swell response. While individual slots and bars are easily seen on the projected image, the non-uniform swell response within an individual layer requires that careful attention must be taken during the actual measurement to ensure consistent measurement of the layer change during the exposure cycles.

Continuing with FIG. 3, at 2 hours exposure, core region layers CR exhibited little change in thickness or in uniformity of swell. After 8 hours water exposure, the layers of core region CR exhibited the same non-uniform swell response as observed in the layers of surface region SR. After 24 hours of water exposure, most layers exhibited non-uniform layer swell. Excessive thickness swell occurred in the high-density layers of surface region SR. Areas A and B in FIG. 3 show much greater swell than the other layers of the OSB samples. The non-uniform layer swell of the OSB samples is likely due to mat structure characteristics of OSB, i.e., heterogeneous furnish characteristics and non-uniform mat formation. A heterogeneous mat structure likely causes additional stress development within the mat during pressing and results in non-uniform stress release during water exposure.

Comparison—Conventional Method v. Present Invention

Table 1 shows a comparison of the average dimensional stability of the commercial OSB samples, after 2, 8 and 24-hours of water soak exposure, using a conventional method (*ASTM* 1037–92 A (1992)) and the present invention for thickness swell determination.

After 2, 8 and 24 hours of water soak, total OSB TS as determined by the conventional method was 3.705%, 8.201% and 14.616%, respectively. ETS as determined by the conventional method was 8.907%, 16.767% and 23.808%, much larger percentages than total OSB TS. Total thickness swell ($TS_{op}$) measured in accordance with the present invention was 9.240%, 17.575% and 24.157% after 2, 8 and 24 hours of water exposure, respectively. The standard deviations of $TS_{op}$ were 0.997% to 2.344%, and were almost the same as the standard deviations for the conventional edge thickness swell measurements. Relative variations of $TS_{op}$ as compared to the conventional thickness swell measurement were 1.468% to 4.819%, and were the least after the 24-hour water soak exposure.

Observed Layer Thickness Swell of OSB

Figure 8:
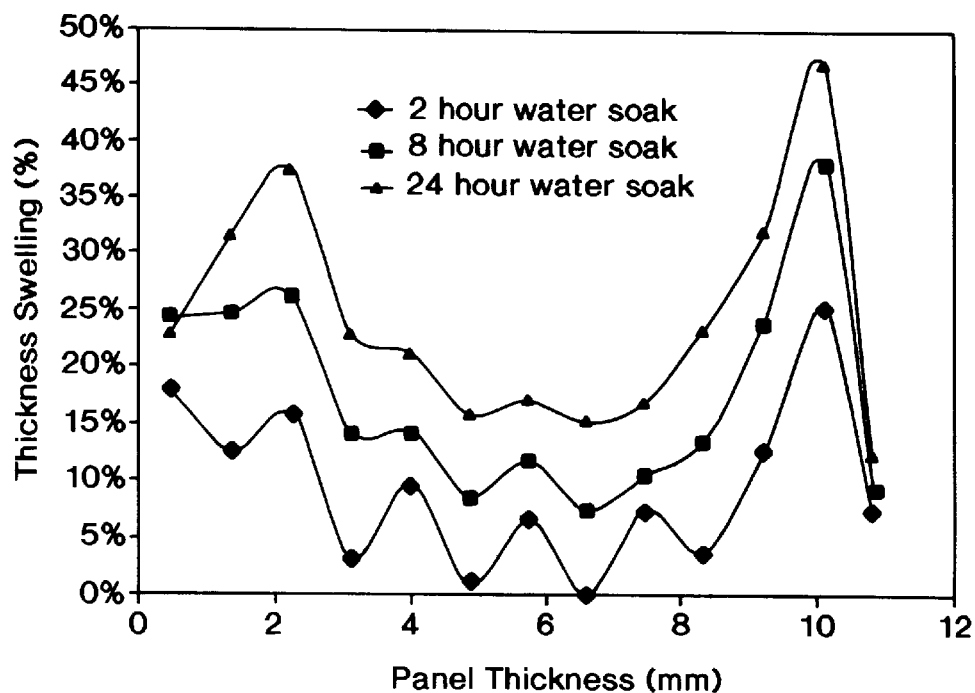
FIG. 8 is a graph depicting actual layer thickness swell of individual OSB layers in relation to water exposure time.

The development of average actual layer thickness swell in relation to the water exposure time and layer location for OSB samples is shown in FIG. 8. Each point of each line in FIG. 8 represents a thickness swell measurement for layers 1–13 in measurement patterns formed on an OSB sample. Layer thickness swell increased with increased water exposure time. Maximum thickness swell is reached after 24 hours of water exposure.

As presented in Tables 2 and 4, there were large differences in swell results between the layers of surface region SR and the layers of core region CR. For example, layer 12 exhibited 47.26% thickness swell (Table 4) after 24 hours of water exposure, and a minimum thickness swell (Table 4) of 15.14% was observed layer 8 for core region CR after 24 hours of water exposure.

Continuing with reference to FIG. 3 and Tables 2 and 4, maximum thickness swell occurred at layers 3 and 12 of surface region SR. This result correlates with the vertical density profile of commercial OSB presented in FIG. 5 in which the surface region layers do not exhibit maximum density within the OSB sample.

Figure 5:
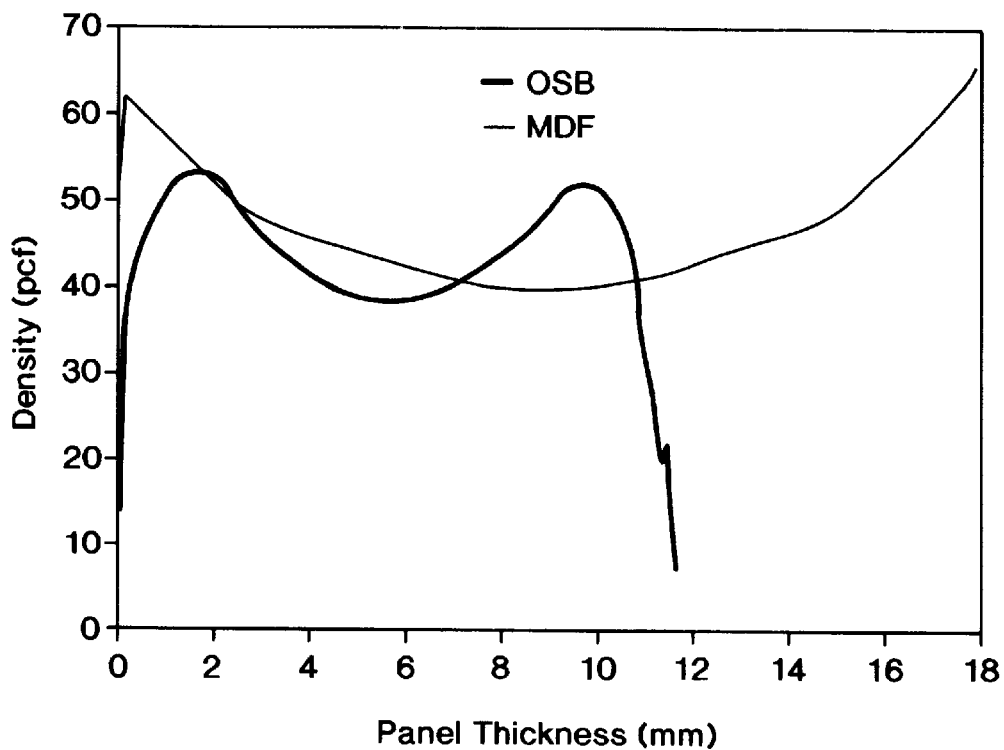
FIG. 5 is a graph depicting vertical density profiles of OSB and MDF.

As shown in FIG. 5, layer 12 comprised the soft side of the OSB sample. Its layer thickness swell was 47.26%, larger than the 37.57% exhibited by layer 3 on the opposite surface region SR of the OSB panel. The lower density of layer 12 is likely caused by the imprint of a screen on the surface region SR of the OSB samples including layer 12, in accordance with standard methods for preparing OSB. The screen also likely allows a faster rate of water absorption on that side of the OSB samples.

Figure 9:
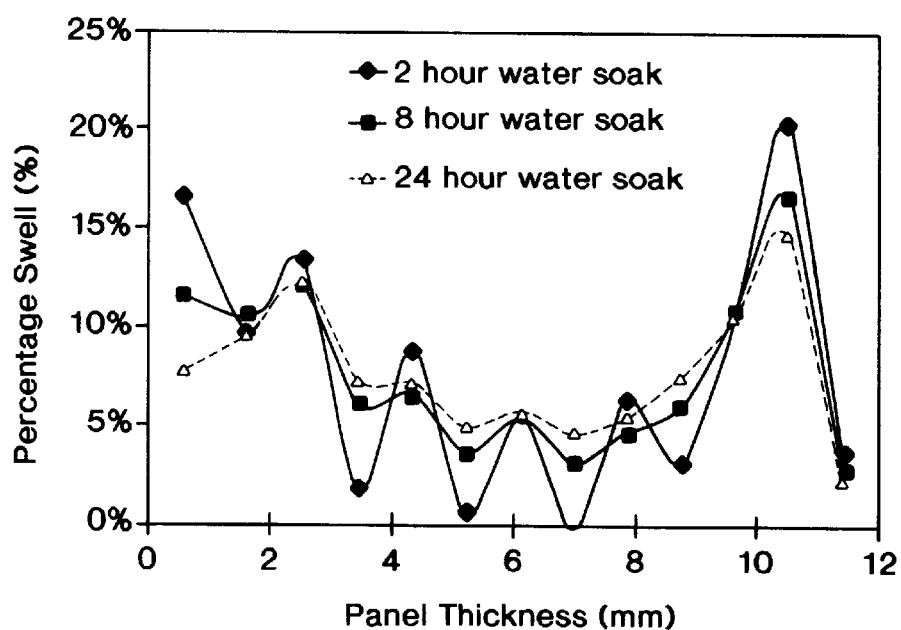
FIG. 9 is a graph depicting percentage thickness swell of individual OSB layers relative to total thickness swell of all layers in relation to water exposure time.

The contribution of individual layers to total TS of commercial OSB was calculated and shown in Table 4 and FIG. 9. Each point on each line in the graph of FIG. 9 represents a thickness swell measurement for layers 1–13 in the measurement pattern formed on the edge of the OSB samples. The contribution of layer 12 to total thickness swell was about 20.24% after 2 hours water exposure, and decreased as exposure time increased. The contribution of layer 12 to total thickness swell was 14.84% after 24-hours water exposure. The contribution of layer 8 to total thickness swell was −0.14% and increased as exposure time increased. The contribution of layer 8 to total thickness swell was only 4.66% after 24-hours water exposure. Thus, layer 12, a high density layer as compared to layer 8, contributed more than three times as much to the total cumulative thickness swell as did low density layer 8.

To better understand the contribution of high and low-density areas on the total thickness swell, the whole thickness of the OSB samples was divided into surface regions SR and core region CR. Surface region SR was 45.3% of whole panel thickness and included layers 1–3 and layers 11–13 from each panel edge. The low-density core region CR was 55.3% of the whole panel thickness and included layers 4–10. The contributions of the high-density SR layers to total thickness swell was 74.36%, 64.39% and 57.3% after 2-hour, 8-hour, 24-hours water exposure, respectively (Table 2).

The data discussed above shows that thickness swell occurred mainly in the high-density surface regions SR during the early stages of the water soak exposure. While water adsorption through the sample edge is one contributing factor to the swell results, the impact of the non-uniform densification that occurs during density profile development in an OSB sample is believed to be another contributing causal factor.

SUMMARY OF THE EXAMPLES

In accordance with an object of the present invention, the process and system for determining layer thickness swell of the present invention identify the contribution of individual layers to overall wood composite material performance and constitute a useful tool to understand thickness swell development in relation to the many process variables incorporated during product manufacture. The Examples presented above revealed the greater contributions of surface region layers to thickness swell for both MDF and OSB wood composite materials. OSB exhibited greater non-uniformity of swell among individual layers, with the greatest non-uniformity in the surface region layers. MDF, made from a more uniform furnish material and hence a more uniform mat structure, showed uniform swell among the layers. There was larger internal stress within OSB samples during water exposure than MDF sample.

The layer swell measurement process of the present invention can thus be used for individual layer measurements, and can also show overall thickness swell. Relative variations for overall thickness swelling compared between the present inventive process and the conventional *ASTM* 1037-92 A (1992) procedure were −10.1 to 3.40% for MDF samples and 1.468 to 4.819% for OSB samples. Relative measurement variations decreased as water exposure time increased, and were less than 3.4% after 24-hour water exposure.

The contributions of high-density surface region layers to overall MDF thickness swell were 95.76%, 75.5% and 61.77% after 2-hour, 8-hour, 24-hour water exposure, respectively. The contributions of high-density surface region layers to overall OSB thickness swell were 74.36%, 64.39% and 57.3% after 2-hour, 8-hour, 24-hour water exposure, respectively. It can be concluded that thickness swell occurred mainly in the high density surface region areas and was greater for these surface region layers than for the core region layers. For the high density surface region layers, thickness swell was greater during the early period of the water exposure cycle as compared to the end of the 24-hour exposure period.

Therefore, the present invention recognizes the importance of discrete layer measurement and the information it reveals and provides about overall wood composite material thickness swell performance. Hence, the present invention addresses previously uncharacterized layer thickness swell attributes of a wood composite material and thus meets a long-felt need in the art for a process which facilitates characterization of these attributes.

TABLE 1

Dimensional Stability of Commercial MDF and OSB after 2, 8, and 24 Hour Water Soak Using Conventional and Inventive Measurement Techniques

| | Comparison-Conventional Measurement (ASTM 1037-92 A (1992) procedure) | | | | | | Present Invention $TS_{op}$ (%) | | |
|---|---|---|---|---|---|---|---|---|---|
| Soak | TS (%) | | ETS (%) | | Water Absorption (%) | | | | |
| Time | Mean | SD | Mean | SD | Mean | SD | Mean | SD | Variation |
| MDF | | | | | MDF | | | | |
| 2 hour | 1.432 | 0.201 | 3.400 | 0.246 | 3.584 | 0.225 | 3.056 | 0.880 | −10.14 |
| 8 hour | 3.026 | 0.033 | 7.782 | 0.271 | 7.316 | 0.287 | 8.351 | 0.651 | 7.308 |
| 24 hour | 5.739 | 0.231 | 13.65 | 0.239 | 14.16 | 0.786 | 14.12 | 0.669 | 3.397 |
| OSB | | | | | OSB | | | | |
| 2 hour | 3.705 | 0.485 | 8.907 | 0.979 | 10.02 | 1.365 | 9.240 | 2.344 | 3.749 |
| 8 hour | 8.201 | 0.929 | 16.77 | 2.011 | 19.03 | 2.906 | 17.57 | 2.072 | 4.819 |
| 24 hour | 14.62 | 2.633 | 23.81 | 1.030 | 31.72 | 5.805 | 24.16 | 0.997 | 1.468 |

TABLE 2

Layer Thickness Swell Distribution of OSB and MDF Samples

| Layer | Layer Thickness | | Thickness Swelling (%) | | |
|---|---|---|---|---|---|
| | mm | % | 2 hour | 8 hour | 24 hour |
| OSB | | | OSB | | |
| Surface Region-Top 3 Layers | 2.67 | 24,15 | 39.92 | 34.12 | 29.75 |
| Core Region-Middle 7 Layers | 6.10 | 55.30 | 25.64 | 35.61 | 42.70 |
| Surface Region-Bottom 3 Layers | 2.27 | 20.56 | 34.44 | 30.27 | 27.55 |
| MDF | | | MDF | | |
| Surface Region-Top 3 Layers | 2.99 | 16.64 | 50.02 | 39.15 | 29.92 |
| Core Region-Middle 14 Layers | 12.30 | 68.46 | 4.24 | 24.50 | 39.33 |
| Surface Region-Bottom 3 Layers | 2.67 | 14.89 | 45.74 | 36.35 | 30.76 |

TABLE 3

Percentage Thickness Swell of Individual Layers Relative to Total Thickness Swell of All Layers of MDF at Three Water Exposure Times

| Layer | Layer Thickness (mm) | Marked | Thickness Swell (%) | | | | | |
|---|---|---|---|---|---|---|---|---|
| | | | 2 hour | | 8 hour | | 24 hour | |
| | | | percentage | actual | percentage | actual | percentage | actual |
| 1 | 1.176 | bar | 37.34 | 16.56 | 21.27 | 27.07 | 13.68 | 29.53 |
| 2 | 0.911 | slot | 2.23 | 1.51 | 9.29 | 15.32 | 8.72 | 24.39 |
| 3 | 0.902 | bar | 10.44 | 6.14 | 8.59 | 14.12 | 7.52 | 21.08 |
| 4 | 0.898 | slot | −4.62 | −2.28 | 2.10 | 3.70 | 4.10 | 11.67 |
| 5 | 0.907 | bar | 6.89 | 3.95 | 4.63 | 7.63 | 4.50 | 12.51 |
| 6 | 0.870 | slot | −4.38 | −2.40 | 0.29 | 0.57 | 2.12 | 6.23 |
| 7 | 0.901 | bar | 4.32 | 2.54 | 3.70 | 6.10 | 3.35 | 9.45 |
| 8 | 0.842 | slot | −4.49 | −2.62 | −0.90 | −1.57 | 1.09 | 3.26 |
| 9 | 0.911 | bar | 1.92 | 1.19 | 2.64 | 4.39 | 1.80 | 4.96 |
| 10 | 0.860 | slot | −2.45 | −1.07 | −0.56 | −0.89 | 1.39 | 4.15 |
| 11 | 0.894 | bar | 2.77 | 1.41 | 2.19 | 3.54 | 2.00 | 5.71 |
| 12 | 0.872 | slot | −4.58 | −2.30 | −0.69 | −0.99 | 1.68 | 4.93 |
| 13 | 0.894 | bar | 3.86 | 2.28 | 2.44 | 4.01 | 2.14 | 6.12 |
| 14 | 0.845 | slot | −3.94 | −1.99 | −0.21 | −0.28 | 2.28 | 6.89 |
| 15 | 0.840 | bar | 4.02 | 2.54 | 2.86 | 5.12 | 3.18 | 9.66 |
| 16 | 0.850 | slot | 0.02 | 0.17 | 1.99 | 3.47 | 4.43 | 13.21 |
| 17 | 0.911 | bar | 4.89 | 2.86 | 4.03 | 6.64 | 5.25 | 14.61 |
| 18 | 0.845 | slot | 2.00 | 1.47 | 5.99 | 10.66 | 7.46 | 22.33 |
| 19 | 0.938 | bar | 8.17 | 4.64 | 10.12 | 16.08 | 8.97 | 24.27 |
| 20 | 0.892 | slot | 35.57 | 21.04 | 20.24 | 34.18 | 14.33 | 40.72 |

The cumulative percentage TS of all layers at each exposure time totals 100 percent.

TABLE 4

Percentage Thickness Swell of Individual Layers Relative to Total Thickness Swell of All Layers of OSB at Three Water Exposure Times

| Layer | Layer Thickness (mm) | Marked | Thickness Swell (%) | | | | | |
|---|---|---|---|---|---|---|---|---|
| | | | 2 hour | | 8 hour | | 24 hour | |
| | | | percentage | actual | percentage | actual | percentage | actual |
| 1 | 0.928 | bar | 16.62 | 17.81 | 11.59 | 24.23 | 7.74 | 23.06 |
| 2 | 0.833 | slot | 9.86 | 12.52 | 10.51 | 24.70 | 9.66 | 31.47 |
| 3 | 0.904 | bar | 13.44 | 15.74 | 12.02 | 26.26 | 12.35 | 37.57 |
| 4 | 0.864 | slot | 1.75 | 3.26 | 6.09 | 14.30 | 7.26 | 22.93 |
| 5 | 0.903 | bar | 8.76 | 9.66 | 6.62 | 14.39 | 7.08 | 21.12 |
| 6 | 0.845 | slot | 0.52 | 0.75 | 3.60 | 8.55 | 4.96 | 15.86 |
| 7 | 0.893 | bar | 5.46 | 6.57 | 5.49 | 11.78 | 5.72 | 17.21 |
| 8 | 0.843 | slot | −0.14 | 0.10 | 3.14 | 7.40 | 4.66 | 15.14 |
| 9 | 0.883 | bar | 6.19 | 7.37 | 4.70 | 10.40 | 5.51 | 16.95 |
| 10 | 0.872 | slot | 3.10 | 3.86 | 5.96 | 13.52 | 7.50 | 23.41 |
| 11 | 0.891 | bar | 10.55 | 12.78 | 10.89 | 24.06 | 10.54 | 32.13 |
| 12 | 0.860 | slot | 20.24 | 25.32 | 16.72 | 38.54 | 14.84 | 47.26 |
| 13 | 0.518 | bar | 3.65 | 7.64 | 2.66 | 9.36 | 2.17 | 12.43 |

The cumulative percentage TS of all layers at each exposure time totals 100 percent.

REFERENCES

The references listed below as well as all references cited in the specification are incorporated herein by reference to the extent that they supplement, explain, provide a background for or teach methodology, techniques and/or compositions employed herein.

Suchsland, O., *Forest Prod. J.* 23(7): 26–30 (1973).
U.S. Pat. No. 4,854,172.
U.S. Pat. No. 5,718,786.
U.S. Pat. No. 5,847,058.
U.S. Pat. No. 5,880,450.
U.S. Pat. No. 5,936,218.
Winistorfer, P. M., S. Wang, and W. W. Moschler, "Dynamics of Wood Composite Mats During Consolidation: Monitoring Density Development During Pressing with an In-situ Density Monitoring System", *Proceedings of the Second European Panel Products Symposium.* Llandudno, Wales, 21–22 October, 1998, p.12–23.
Xu, W. and P. M. Winistorfer, *Wood and Fiber Science* 27(2):119–125 (1995).
Xu, W. and P. M. Winistorfer, *Forest Prod. J.* 45(10):67–71 (1995).

It will be understood that various details of the invention can be changed without departing from the scope of the invention. Furthermore, the foregoing description is for the purpose of illustration only, and not for the purpose of limitation—the invention being defined by the claims.

What is claimed is:

1. A process of obtaining a thickness swell measurement for a wood composite material sample, the process comprising:
   (a) placing a measurement pattern on an edge of a wood composite material sample, the measurement pattern comprising a plurality of layers, each of the layers having a thickness;
   (b) measuring the thickness of at least one of the layers of the measurement pattern prior to exposing the wood composite material sample to a thickness swell-inducing condition;
   (c) exposing the wood composite material sample to a thickness swell-inducing condition; and
   (d) re-measuring the thickness of the at least one layer measured in step (b) to thereby obtain a thickness swell measurement for the wood composite material sample.

2. The process of claim 1, wherein the wood composite material is medium density fiberboard, oriented strandboard, particleboard, laminated veneer lumber, plywood, a panel manufactured from an agricultural fiber source, a wood composite comprising dissimilar wood furnish materials, or a wood composite material comprising wood and nonwood furnish.

3. The process of claim 1, wherein the layers are further characterized as alternating layers.

4. The process of claim 3, wherein the layers are further characterized as alternating contrasting layers.

5. The process of claim 1, wherein the measurement pattern is placed on the edge of the wood composite material sample by placing a coating on at least a portion of the edge of the wood composite material sample and forming the layers of the measurement pattern in the coating.

6. The process of claim 5, wherein the layers are further characterized as a plurality of alternating slots and bars.

7. The process of claim 1, wherein the measurement pattern is stamped or marked on the edge of the wood composite material sample.

8. The process of claim 1, further comprising measuring a thickness of each of two or more of the layers in step (b); and re-measuring the thickness of said each of two or more of the layers in step (d) to thereby obtain a thickness swell measurement for the wood composite material sample.

9. The process of claim 1, further comprising measuring a thickness of each layer in the measurement pattern in step (b); and re-measuring the thickness of each layer in the measurement pattern in step (d) to thereby obtain a thickness swell measurement for the wood composite material sample.

10. The process of claim 1, further comprising measuring a thickness of at least one layer in a surface region of the wood composite material sample in step (b); and re-measuring the thickness of the at least one layer in the surface region in step (d) to thereby obtain a thickness swell measurement in the surface region of the wood composite material sample.

11. The process of claim 1, further comprising measuring a thickness of at least one layer in a core region of the wood composite material sample in step (b); and re-measuring the thickness of the at least one layer in the core region in step (d) to thereby obtain a thickness swell measurement in the core region of the wood composite material sample.

12. The process of claim 1, wherein the step of re-measuring the thickness of the at least one layer after exposing the wood composite material sample to a thickness swell-inducing condition is repeated at a series of time intervals after exposing the wood composite material sample to the thickness swell-inducing condition.

13. The process of claim 1, wherein the thickness swell measurement is selected from the group consisting of an edge thickness swell measurement, a total thickness swell measurement, a layer thickness swell measurement and combinations thereof.

14. The process of claim 1, further comprising:
(a) placing a measurement pattern on two or more edges of the wood composite material sample, the measurement pattern comprising a plurality of layers, each of the layers having a thickness,
(b) measuring the thickness of at least one of the layers within each measurement pattern prior to exposing the wood composite material sample to a thickness swell-inducing condition;
(c) exposing the wood composite material sample to a thickness swell-inducing condition; and
(d) re-measuring the thickness of the at least one layer in each measurement pattern measured in step (b) to thereby obtain a thickness swell measurement for the wood composite material sample.

15. The process of claim 14, wherein the thickness swell measurement is obtained by averaging the thickness measurements of the at least one layer in each measurement pattern.

16. A process of obtaining a thickness swell measurement for a wood composite material sample, the process comprising:
(a) placing a measurement pattern on an edge of the wood composite material sample, the measurement pattern comprising a plurality of alternating contrasting layers; each of the alternating contrasting layers having a thickness;
(b) measuring the thickness of at least one of the alternating contrasting layers of the measurement pattern prior to exposing the wood composite material sample to a thickness swell-inducing condition;
(c) exposing the wood composite material sample to a thickness swell-inducing condition; and
(d) re-measuring the thickness of the at least one layer measured in step (b) to thereby obtain a thickness swell measurement for the wood composite material sample.

17. The process of claim 16, wherein the wood composite material is medium density fiberboard, oriented strandboard, particleboard, laminated veneer lumber, plywood, a panel manufactured from an agricultural fiber source, a wood composite comprising dissimilar wood furnish materials, or a wood composite material comprising wood and nonwood furnish.

18. The process of claim 16, wherein the measurement pattern is placed on the edge of the wood composite material sample by placing a coating on at least a portion of the edge of the wood composite material sample and forming the layers of the measurement pattern in the coating.

19. The process of claim 18, wherein the layers are further characterized as a plurality of alternating slots and bars.

20. The process of claim 16, wherein the measurement pattern is stamped or marked on the edge of the wood composite material sample.

21. The process of claim 16, further comprising measuring a thickness of each of two or more of the layers in step (b); and re-measuring the thickness of the each of two or more of the layers in step (d) to thereby obtain a thickness swell measurement for the wood composite material sample.

22. The process of claim 16, further comprising measuring a thickness of each layer in the measurement pattern in step (b); and re-measuring the thickness of each layer in the measurement pattern in step (d) to thereby obtain a thickness swell measurement for the wood composite material sample.

23. The process of claim 16, further comprising measuring a thickness of at least one layer in a surface region of the wood composite material sample in step (b); and re-measuring the thickness of the at least one layer in the surface region in step (d) to thereby obtain a thickness swell measurement in the surface region of the wood composite material sample.

24. The process of claim 16, further comprising measuring a thickness of at least one layer in a core region of the wood composite material sample in step (b); and re-measuring the thickness of the at least one layer in the core region in step (d) to thereby obtain a thickness swell measurement in the core region of the wood composite material sample.

25. The process of claim 16, wherein the step of re-measuring the thickness of the at least one layer after exposing the wood composite material sample to a thickness swell-inducing condition is repeated at a series of time intervals after exposing the wood composite material sample to the thickness swell-inducing condition.

26. The process of claim 16, wherein the thickness swell measurement is selected from the group consisting of an edge thickness swell measurement, a total thickness swell measurement, a layer thickness swell measurement and combinations thereof.

27. The process of claim 16, further comprising:
(a) placing a measurement pattern on two or more edges of the wood composite material sample, the measurement pattern comprising a plurality of alternating contrasting layers, each of the alternating contrasting layers having a thickness;
(b) measuring the thickness of at least one of the layers within each measurement pattern prior to exposing the wood composite material sample to a thickness swell-inducing condition;
(c) exposing the wood composite material sample to a thickness swell-inducing condition; and
(d) re-measuring the thickness of the at least one layer in each measurement pattern measured in step (b) to thereby obtain a thickness swell measurement for the wood composite material sample.

28. The process of claim 27, wherein the thickness swell measurement is obtained by averaging the thickness measurements of the at least one layer in each measurement pattern.

29. A system for obtaining a thickness swell measurement for a wood composite material sample, the system comprising:
(a) means for placing a measurement pattern on an edge of a wood composite material sample, the measurement pattern comprising a plurality of layers, each of the layers having a thickness; and (b) means for measuring the thickness of at least one of the layers of the measurement pattern prior to and after exposing the wood composite material sample to a thickness swell-inducing condition to thereby obtain a thickness swell measurement for the wood composite material sample.

30. The system of claim 29, wherein the means for placing the measurement pattern on an edge of the wood composite material sample further comprises means for forming the layers into the edge of the wood composite material sample.

31. The system of claim 30, wherein the means for forming layers into an edge of a wood composite material sample is a cutterhead comprising a plurality of saw blades.

32. The system of claim 30, further comprising means for limiting depth of the means for forming the layers into an edge of a wood composite material sample.

33. The system of claim 32, wherein the means for limiting depth is a fence.

34. The system of claim 29, wherein the means for measuring the thickness of at least one of the layers of the measurement pattern prior to and after exposing the wood composite material sample to a thickness swell-inducing condition comprises a camera and a measurement indicator having a known measurement dimension.

35. The system of claim 34, wherein the camera is mounted to a stereo microscope.

36. A system for use in obtaining a thickness swell measurement for a wood composite material sample, the system comprising:

(a) a cutterhead comprising a plurality of saw blades for forming a measurement pattern on an edge of a wood composite material sample, the measurement pattern comprising a plurality of layers, each of the layers having a thickness; and (b) a camera and a measurement indicator having a known measurement dimension for measuring the thickness of at least one of the layers of the measurement pattern prior to and after exposing the wood composite material sample to a thickness swell-inducing condition to thereby obtain a thickness swell measurement for the wood composite material sample.

37. The system of claim 36, further comprising a fence for limiting cutting depth of the cutterhead into an edge of a wood composite material sample.

38. The system of claim 36, wherein the camera is mounted to a stereo microscope.

* * * * *